UNITED STATES PATENT OFFICE.

CHARLES B. JACOBS, OF EAST ORANGE, NEW JERSEY, ASSIGNOR, BY MESNE ASSIGNMENTS, TO THE UNITED BARIUM COMPANY, OF JERSEY CITY, NEW JERSEY, A CORPORATION OF NEW JERSEY.

PROCESS OF PREPARING BARIUM HYDRATE.

SPECIFICATION forming part of Letters Patent No. 720,927, dated February 17, 1903.

Application filed October 11, 1901. Serial No. 78,322. (No specimens.)

*To all whom it may concern:*

Be it known that I, CHARLES B. JACOBS, a citizen of the United States, residing at East Orange, in the county of Essex and State of New Jersey, have invented certain new and useful Improvements in Processes of Preparing Barium Hydrate, of which the following is a specification.

This invention relates to the preparation of barium hydrate, and its object is to produce barium hydrate in a substantially pure and colorless condition.

In my Patent No. 624,041, dated May 2, 1899, is described a process for the production of barium hydrate from barium sulfate by heating the sulfate in the electric furnace and subsequent treatment with water. In carrying out this process I have found that when the product from the electric furnace is treated with water and the barium hydrate is crystallized out and fused the resulting products are discolored more or less by the presence of entrapped sulfhydrate and iron salts. To correct this difficulty is the object of my present invention.

My invention is carried out as follows: The mixture of barium oxid and sulfid from the electric furnace is placed in a tank and boiled with hot water and steam, forming hydrate and sulfhydrate, sufficient water being taken to give a solution of gravity 1.25. The tank is then closed, and by compressed air the solution is forced upwardly through a cloth filter into crystallizing-tanks. The crystallizing-tanks are kept cool by water circulating around them or in coils, giving rapid crystallization with resulting small crystals, and the same effect is aided by scraping the sides of the tanks to expose free surface to the liquid. The small loose crystallization prevents, to a large extent, entrapping of sulfhydrate liquor in the hydrate crystals. After the hydrate crystals have settled out the sulfhydrate liquor is pumped off to an evaporating-pan and concentrated, and the barium hydrate still remaining therein is crystallized out. The remaining sulfhydrate liquor may be sold as such.

The barium-hydrate crystals produced by above operations are dried and washed in a centrifugal until they show less than one per cent. of sulfhydrate.

When the resulting barium-hydrate crystals are melted in their water of crystallization, they become discolored, so as to impair the appearance and salability of the product. Analysis shows extremely small amounts of impurity, mostly sulfhydrate; but from the color assumed it appears that the difficulty is due partly to ferrous or ferric coloring-matter. To remove this color, I proceed as follows:

When the barium hydrate has been melted in its water of crystallization, superheated steam is passed into it, with the result that hydrogen sulfid is evolved from the barium sulfhydrate, a corresponding amount of barium hydrate being formed at the same time. By this means practically all of the sulfur can be eliminated. The coloration still remains, however, sometimes to a very marked extent and, as above stated, is probably due to iron. To overcome this, I add to the melted barium hydrate a small proportion of zinc sulfate in solution, one ton of barium hydrate requiring generally about one pound of $ZnSO_4.7H_2O$ to clear up the color. The resulting crystals obtained on cooling the bath are colorless, or substantially so, and the small amount of zinc compound contained therein has no injurious effect. The reason why the zinc sulfate acts to decolorize the crystals has not been ascertained; but it is assumed that it precipitates a portion of the barium sulfate, carrying the iron down by mechanical action. The proportions of coloring-matter are so small as not to permit of investigation in this direction. Other substances, such as alum, may be used as precipitating agents for this purpose.

It is clear that while the crystals are preferably fused in their water of crystallization more or less additional water might be added, and the expression "fused with water" is intended to cover either mode of operation.

Having thus described my invention, what I claim as new therein, and desire to secure by Letters Patent, is—

1. The process of purifying barium hydrate crystals which consists in fusing the said crystals in their own water of crystallization, then treating with superheated steam.

2. The process which consists in fusing with water barium hydrate containing as impurities, coloring-matters including barium sulfhydrate, subjecting it to the action of superheated steam to decompose the sulfhydrate with formation of hydrate and hydrogen sulfid, and adding zinc sulfate to the fused material.

3. The process which consists in fusing with water, barium hydrate containing coloring-matter, and adding to the fused material a sulfate capable of forming with the barium hydrate a precipitate of barium sulfate.

4. The process which consists in fusing with water barium hydrate which becomes discolored in such fusion, and adding zinc sulfate to cause decolorization thereof.

5. The process which consists in heating a mixture of barium oxid and sulfid with water, filtering, crystallizing rapidly and in such manner as to produce small crystals, washing and drying the crystals, fusing the crystals and subjecting the fused material to the action of superheated steam and of zinc sulfate.

CHARLES B. JACOBS.

Witnesses:
A. K. JACOBS,
E. M. MACDOWELL.